(12) United States Patent
Depraete

(10) Patent No.: US 9,885,406 B2
(45) Date of Patent: Feb. 6, 2018

(54) HYDROKINETIC TORQUE COUPLING DEVICE FOR A MOTOR VEHICLE

(71) Applicant: VALEO EMBRAYAGES, Amiens (FR)

(72) Inventor: Alexandre Depraete, Bloomfield, MI (US)

(73) Assignee: Valeo Embrayages (FR)

( * ) Notice: Subject to any disclaimer, the term of this patent is extended or adjusted under 35 U.S.C. 154(b) by 44 days.

(21) Appl. No.: 14/873,334

(22) Filed: Oct. 2, 2015

(65) Prior Publication Data

US 2017/0097078 A1 Apr. 6, 2017

(51) Int. Cl.
 *F16H 45/02* (2006.01)
 *F16F 15/121* (2006.01)
 *F16F 15/129* (2006.01)

(52) U.S. Cl.
 CPC .......... *F16H 45/02* (2013.01); *F16F 15/121* (2013.01); *F16F 15/129* (2013.01); *F16H 2045/0221* (2013.01)

(58) Field of Classification Search
 CPC .... F16H 45/02; F16H 2045/0221–2045/0231; F16F 15/121–15/1216; F16F 2230/0064
 See application file for complete search history.

(56) References Cited

U.S. PATENT DOCUMENTS

| 2,551,718 A | 5/1951 | Auten |
| 4,145,936 A | 3/1979 | Vincent et al. |
| 5,697,261 A | 12/1997 | Mokdad et al. |
| 5,893,355 A | 4/1999 | Glover et al. |
| 6,224,487 B1 * | 5/2001 | Yuergens .......... F16F 15/12366 464/68.41 |
| 2001/0032767 A1 * | 10/2001 | Reinhart et al. .......... F16F 1/34 192/3.29 |
| 2003/0106763 A1 | 6/2003 | Kimura et al. |
| 2015/0107950 A1 * | 4/2015 | Mauti ..................... F16H 45/02 192/3.28 |
| 2015/0369296 A1 | 12/2015 | Lopez-Perez |

FOREIGN PATENT DOCUMENTS

| DE | 19729421 A1 | 1/1998 |
| DE | 19919449 A1 | 11/1999 |
| DE | 102004024747 A1 | 12/2005 |
| EP | 1048420 A2 | 11/2000 |

(Continued)

*Primary Examiner* — Richard Lorence
(74) *Attorney, Agent, or Firm* — Berenato & White, LLC

(57) ABSTRACT

The disclosure describes a hydrokinetic torque coupling device for a motor vehicle. The coupling device includes a torque input element (11) intended to be coupled to a crankshaft (1), an impeller wheel (3) rotationally coupled to the torque input element (11) and able to hydrokinetically drive a turbine wheel (4). The turbine wheel, in turn, drives a torque output element (8) intended to be coupled to a transmission input shaft (2). The device further includes a clutch (10) able to rotationally couple and uncouple the torque input element (11) and the torque output element (8) between engaged and disengaged positions. When the clutch is in an engaged position, torque passes from the torque input element (11) to the torque output element (8) through an included damper system (18, 22).

20 Claims, 3 Drawing Sheets

(56) References Cited

FOREIGN PATENT DOCUMENTS

| | | | |
|---|---|---|---|
| FR | 2339107 | A1 | 8/1977 |
| FR | 2493446 | A1 | 5/1982 |
| FR | 2499182 | A1 | 8/1982 |
| FR | 2628804 | A1 | 9/1989 |
| FR | 2714435 | A1 | 6/1995 |
| FR | 2828543 | A1 | 2/2003 |
| FR | 2938030 | A1 | 5/2010 |
| FR | 3000155 | A1 | 6/2014 |
| FR | 3008152 | A1 | 1/2015 |
| GB | 1212042 | A | 11/1970 |
| GB | 2235749 | A | 3/1991 |
| GB | 2262795 | A | 6/1993 |
| GB | 2283558 | A | 5/1995 |
| GB | 2284875 | A | 6/1995 |
| GB | 2468030 | A | 8/2010 |
| JP | 09280317 | A | 10/1997 |
| WO | WO9914114 | A1 | 3/1999 |
| WO | WO9941525 | A1 | 8/1999 |
| WO | WO2004016968 | A1 | 2/2004 |
| WO | WO2011006264 | A1 | 1/2011 |
| WO | WO2014128380 | A1 | 8/2014 |

\* cited by examiner

HYDROKINETIC TORQUE COUPLING DEVICE FOR A MOTOR VEHICLE

FIELD OF THE INVENTION

The present invention relates to a hydrokinetic torque coupling device for a motor vehicle, such as a torque converter, for instance.

BACKGROUND OF THE INVENTION

A known hydrodynamic torque converter is schematically and partially illustrated in FIG. 1 and makes it possible to transmit a torque from the output shaft of an internal combustion engine in a motor vehicle, such as for instance a crankshaft 1, to a transmission input shaft 2.

The torque converter conventionally comprises an impeller wheel 3, able to hydrokinetically drive a turbine wheel 4 through a reactor 5.

The impeller wheel 3 is coupled to the crankshaft 1 and the turbine wheel 4 is coupled to guiding washers 6.

A first group of elastic members 7a, 7b of the compression spring type is mounted between the guiding washers 6 and a central hub 8 coupled to the transmission input shaft 2. The elastic members 7a, 7b of the first group are arranged in series through a phasing member 9, so that said elastic members 7a, 7b are deformed in phase with each other, with said phasing member 9 being movable relative to the guiding washers 6 and relative to the hub 8.

A second group of elastic members 7c is mounted with some clearance between the guiding washers 6 and the central hub 8 in parallel with the first group of elastic members 7a, 7b, with said elastic members 7c being adapted to be active on a limited angular range, more particularly at the end of the angular travel of the guiding washers 6 relative to the central hub 8. The angular travel, or the angular shift noted α, of the guiding washers 6 relative to the hub 8, is defined relative to a rest position (α=0) wherein no torque is transmitted through the damping means formed by the above-mentioned elastic members 7a, 7b.

The torque converter further comprises clutch means 10 adapted to transmit a torque from the crankshaft 1 to the guiding washers 6 in a determined operation phase, without any action from the impeller wheel 3 and the turbine wheel 4.

The second group of elastic members 7c makes it possible to increase the stiffness of the damping means at the end of the angular travel, i.e. for a significant α angular offset of the guiding washers 6 relative to the hub 8 (or vice versa).

It can be seen that the representation of function M=f(α) which defines the M torque transmitted though the device according to the α angular shift, comprises a first linear portion of slope Ka (for the low values of the α angular shift) and a second, more important, linear portion of slope Kb (for the high value of the α angular shift). Ka and Kb are the angular stiffness of the device, at the beginning and at the end of the angular travel respectively. If K1 defines the cumulated stiffness of the first springs of each pair of the first group, and K2 defines the cumulated stiffness of the second springs of each pair of the first group, and K3 defines the cumulated stiffness of the springs of the second group, then Ka=(K1.K2)/(K1+K2) and Kb=Ka+K3.

The break of slope between the first and second portions of the curve may generate vibrations and a significant hysteresis upon operation of the torque converter which might affect the quality of filtration obtained using the damping means.

SUMMARY OF THE INVENTION

The invention more particularly aims at providing a simple, efficient and cost-effective solution to this problem.

For this purpose, it provides for a hydrokinetic torque coupling device for a motor vehicle, comprising
a torque input element intended to be coupled to a crankshaft,
a turbine wheel,
an impeller wheel rotationally coupled to the torque input element and able to hydrokinetically drive a turbine wheel, a torque output element intended to be coupled to a transmission input shaft, damping means, clutch means adapted to rotationally couple the torque input element and the torque output element in an engaged position, through the damping means, and able to rotationally uncouple the torque input element and the torque output element in a disengaged position, with the damping means being adapted to act against the rotation of the torque input element relative to the torque output element, in the engaged position of the clutch means, with the damping means comprising at least an elastic blade which rotates together with the torque output element or the clutch means respectively, and a supporting member carried by the clutch means or the torque output element respectively, with the blade being elastically maintained supported by said supporting member, with said elastic blade being adapted to bend upon rotation of the torque input element relative to the torque output element, in an engaged position, with the hydrokinetic torque coupling device further comprising friction means adapted to generate a hysteresis torque through the relative motion of the supporting member and the elastic blade and/or of the clutch means and the torque output element.

Such damping means give a characteristic gradual curve, without any break of slope. The invention thus makes it possible to reduce the vibrations generated in operation and provides a high quality of filtration.

Besides, such a hydrokinetic torque coupling device is easy to mount and rather inexpensive.

The impeller wheel is rotationally coupled to the torque input element and is able to hydrokinetically drive the turbine wheel, through a reactor.

It should be noted that the words "radial" and "axial" are defined with respect to the hydrokinetic torque coupling device, which is the axis of rotation of the impeller wheel or of the turbine wheel.

It should be noted that a hydrokinetic torque coupling device may be a torque converter when the hydrokinetic torque coupling means comprise an impeller wheel, a turbine wheel and a reactor, or may be a hydrokinetic coupling device when the hydrokinetic torque coupling means have no reactor.

Besides, the presence of friction means makes it possible to control the amount of vibrations generated in operation, so as to enhance the damping of such vibrations and of the rotation acyclisms.

The clutch means may comprise one piston which can move between an engaged position wherein it is rotationally coupled to the torque input element and a disengaged position wherein it is rotationally uncoupled from the torque input element, with the piston being rotationally coupled to the supporting member.

In this case, the piston is rotationally coupled to the supporting member through a linking member, with the friction means being adapted to generate a hysteresis torque through the relative motion of the linking member and the elastic blade.

Additionally, the elastic blade may comprise a fastening portion connected to the torque output element and an elastic portion comprising a radially internal strand, a radially external strand, and a bowed or bent portion connecting the internal strand and the external strand, with the external strand being supported by the supporting member, with the friction means being adapted to generate a hysteresis torque through the relative motion of the piston or the linking member on the one hand, and the external strand of the elastic blade, on the other hand.

Besides, the hydrokinetic torque coupling may comprise a flange rotationally coupled to the torque output element, with the friction means being adapted to generate a hysteresis torque through the relative motion of the flange on the one hand, and the supporting member or the piston, on the other hand.

The supporting member may comprise a rolling body mounted to pivot about a shaft, with said shaft being fastened to the clutch means.

In this case, the friction means are adapted to generate a hysteresis torque through the relative motion between the flange on the one hand, and the shaft of the supporting member, on the other hand.

The linking member may be fastened to the shaft of the supporting member, for instance by a rivet, a bolt or a screw.

The turbine wheel is fastened to the torque output element by riveting, for instance.

The torque output element may comprise a central hub, The turbine wheel and the linking member are rotationally connected to the central hub by a common fastening means or are each rotationally connected to the central hub by a different fastening means.

Besides, the friction means may comprise two friction surfaces, formed for instance by the clutch lining, and adapted to be supported by each other so as to rub each other through the relative motion of the two friction surfaces.

Besides, the hydrokinetic torque coupling device may comprise a reactor, with the impeller wheel being adapted to hydrokinetically drive the turbine wheel through the reactor. The hydrokinetic torque coupling device thus forms a torque converter.

The hydrokinetic torque coupling device may also comprise one or more of the following characteristics:

The rolling body of the supporting member consists of a roller so mounted as to pivot about a shaft, for instance through a rolling bearing, such as a needle bearing, for instance.

the supporting member is mounted on the radially external periphery of the piston or of the linking member, the impeller wheel is rotationally coupled to a cover wherein the impeller wheel, the turbine wheel and/or the damping means are at least partially accommodated.

the torque input element comprises said cover, the elastic blade is so designed that, in the engaged position, in a relative angular position between the torque input element and the torque output element different from a rest position, the supporting member exerts a bending stress on the elastic blade causing a cross reaction force of the elastic blade on the supporting member, with such reaction force having a circumferential component which tends to move back the torque input element and the torque output element toward said relative rest position.

the elastic blade is so designed that, in the engaged position, in a relative angular position between the torque input element and the torque output element different from a rest position, the supporting member exerts a bending stress on the elastic blade causing a cross reaction force of the elastic blade on the supporting member, with such reaction force having a radial component which tends to maintain the elastic blade in contact with the supporting member, in the engaged position, the angular displacement of the torque input element relative to the torque output element is greater than 20° and preferably greater than 40°.

the damping means comprise at least two elastic leaves, with each elastic blade rotating together with the torque output element, or the piston in engaged position respectively, with each blade being associated with a supporting element rotationally linked with the piston in engaged position, or the torque output element respectively, with each blade being elastically maintained supported by said matching supporting element, with each elastic blade being adapted to bend upon rotation of the torque input element relative to the torque output element in engaged position.

BRIEF DESCRIPTION OF THE DRAWINGS

The invention will be better understood, and other details, characteristics and advantages of the invention will appear upon reading the following description given by way of a non restrictive example while referring to the appended drawings wherein.

DETAILED DESCRIPTION OF THE PREFERRED EMBODIMENT(S)

Figure 1:
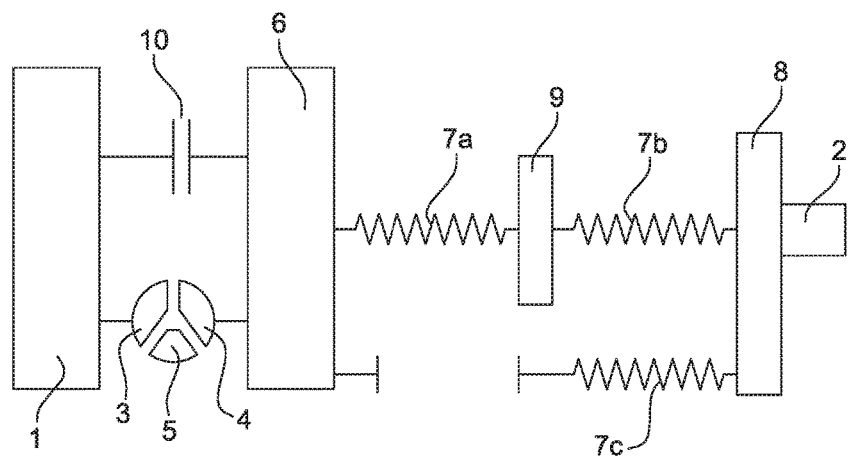
FIG. 1 is a schematic representation of a torque converter of the prior art.
Figure 2:
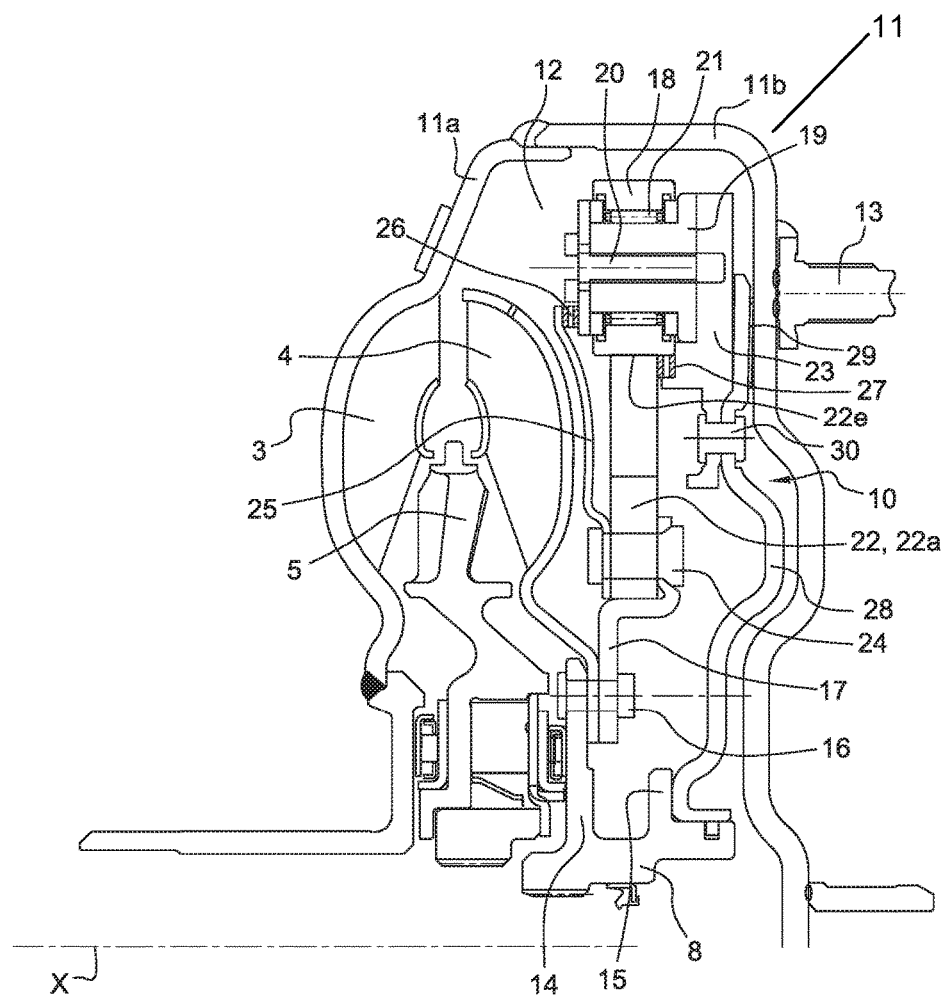
FIG. 2 is a half-view along an axial plane, of a torque converter according to one embodiment of the invention.
Figure 3:
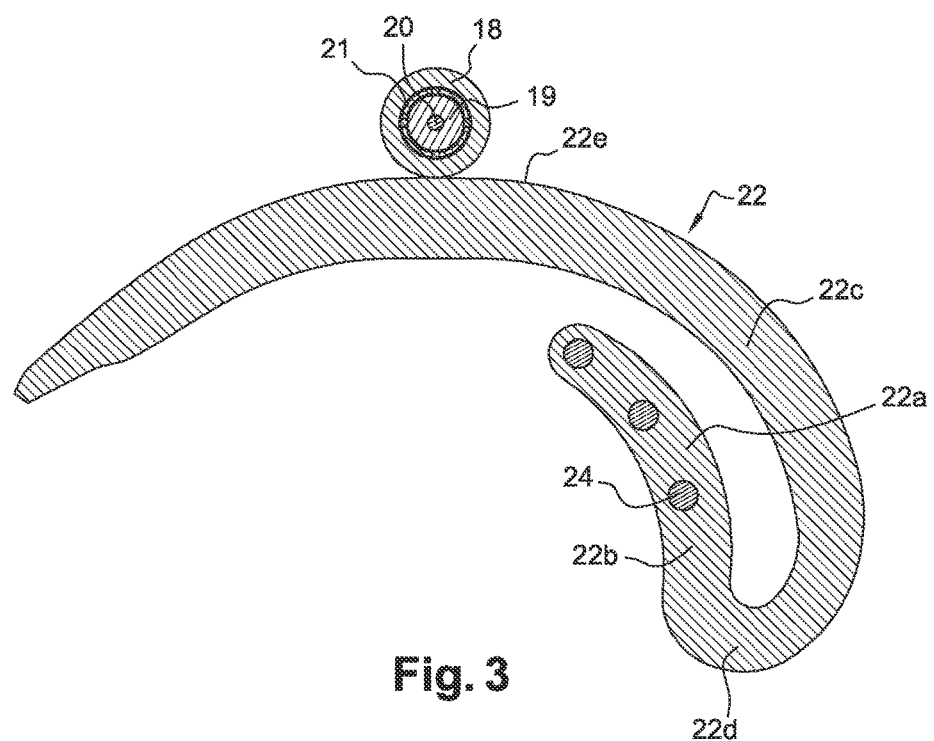
FIG. 3 is a sectional view illustrating an elastic blade cooperating with a supporting member, with the blade and the supporting blade being part of the torque converter of FIG. 2.

A hydrokinetic torque coupling device according to one embodiment of the invention is shown in FIGS. 2 and 3. Such hydrokinetic torque coupling device is more specifically a hydrodynamic torque converter which makes it possible to transmit a torque from the output shaft of an internal combustion engine in a motor vehicle, such as for instance a crankshaft 1, to a transmission input shaft 2. The axis of the torque converter bears reference X.

In the following, the words "axial" and "radial" are defined relative to the X axis.

The torque converter conventionally comprises an impeller bladed wheel 3, able to hydrokinetically drive a turbine bladed wheel 4 through a reactor 5.

The impeller wheel 3 is fastened to a cover consisting of two belt-shaped parts 11a, 11b assembled together by welding and defining an internal volume 12 accommodating the impeller wheel 3, the turbine wheel 4 and the reactor 5. Said cover 11a, 11b, also more generally referred to as cover 11, comprises fastening means 13 making it possible to rotationally couple said cover 11 with the crankshaft 1.

The torque converter further comprises a central hub 8, the radially internal periphery of which is ribbed, with an X axis and accommodated in the internal volume 12 of the cover 11. The central hub 8 comprises a first annular rim 14 which extends radially outwards and a second annular rim 15 which extends radially outwards and positioned ahead of the first rim 14.

The turbine wheel 4 is fastened to the first annular rim 14 of the central hub 8, for instance by rivets 16 or by welding. The turbine wheel 4 is also fastened on the radially internal periphery of an annular support or a linking member 17, having an X axis, with said support 17 being mounted in the internal volume 12.

The turbine wheel 4, the flange 17 and/or the central hub 8 may consist of one or more distinct parts without the operation of the torque converter being affected since such parts are fastened together.

The torque converter further comprises damping means comprising supporting members and elastic leaves.

Two supporting members or rolling bodies 18 shaped as rollers or cylindrical rollers, are fixed on the radially external periphery of a linking member 23. The rolling bodies 18 are positioned so as to be diametrically opposed. The rolling bodies 18 are more specifically mounted about axially extending shafts 19, with said shafts 19 being mounted on the linking member 17 using screws 20, bolts or rivets, for instance. The rolling bodies 18 are mounted on the shafts 19 through rolling bearings, such as needle bearings 21, for instance.

The torque converter further comprises two elastic leaves 22. As can be best seen in FIG. 3, each elastic blade 22 comprises a fastening portion 22a, which is fastened to the support by rivets 24, here three in number for each blade 22, and an elastic portion comprising a radially internal strand 22b, a radially external strand 22c, and a bowed or bent portion 22d connecting the internal strand 22b and the external strand 22c. The bowed or bent portion 22d has an angle of approximately 180°. In other words, the elastically deformable portion of the elastic blade 25 comprises two regions radially shifted relative to each other and separated by a radial space. Such blade 22 is for example known from document FR 3 008 152 in the name of the Applicant.

The external strand 22c develops on the circumference with an angle ranging from 120° to 180°. The radially external strand 22c comprises a radially external surface 22e which forms a raceway supported by the corresponding rolling body 18, with said rolling body 18 being positioned radially outside the external strand 22c of the elastic blade 22. The raceway 22e has a globally convex shape. The raceway 22e may directly consist of a zone of the external strand 22c or of a part which is added onto said external strand 22c.

Between each elastic blade 22 and the matching rolling body 18, the transmitted torque is broken down into radial stresses and peripheral stresses. Radial stresses make it possible for the matching blade 22 to bend and peripheral stresses make it possible for the matching rolling body 18 to move on the raceway 22e of the blade 22 and to transmit the torque.

A radially extending annular flange 25 is fastened to the support 17. The radially internal periphery of the flange 25 is more particularly fastened to the radially external periphery of the support 17, by rivets 16 for instance. The annular flange 25 is axially resilient.

First friction means 26 are mounted between the radially external periphery of the flange 25 and the shafts 19 which support the rolling bodies 18, so as to generate a hysteresis torque from the rotating motion of the flange 25 and the matching shaft 19. Second friction means 27 are mounted between the linking member 23 and the external strands 22c of the elastic leaves 22 so as to generate a hysteresis torque from the rotating motion of the linking member 23 and the matching external strand 22c. The first and second friction means 26, 27 are formed by facing clutch linings, adapted to rub each other through the rotating motion of one of the clutch lining relative to the opposite clutch lining.

The torque converter further comprises clutch means 10 adapted to rotationally couple the cover 11 and the linking member in the engaged position, and adapted to release the cover 11 from the linking member 23 in a disengaged position.

The clutch means 10 comprise an annular piston 28 which extends radially and is accommodated in the inner space 12 of the cover 10, the radially external periphery of which comprises a resting area equipped with clutch lining 29 and adapted to rest on the part 11 b of the cover 11 in an engaged position, so as to provide a rotational coupling of the cover 11 and the piston 28.

The linking member 23 is fastened to the radially internal periphery of the piston 28, for instance by rivets 30. The linking member 23 and the piston 28 may of course consist of one single part, without the operation of the torque converter being affected.

The elastic leaves 22 and the rolling bodies 18 are such that the rolling bodies 18 may be moved in operation with the piston 28 along the X axis relative to the elastic leaves 22. It should be noted here that, when the piston 28 and the rolling bodies 18 are moving, the clutch lining on the first friction means 26 are maintained supported on each other thanks to the resilience of the flange 25 along the X axis.

The axial motion of the piston 28 is controlled by pressure chambers positioned on either side of the piston 28. Besides, the motion of the piston 28 in the disengaged position may be limited by the radially internal periphery of the piston 28 resting on the second annular rim 15 of the central hub 8.

Such clutch means 10 make it possible to transmit a torque from the crankshaft 1 to the transmission input shaft 2, in a determined operation phase, without any action by the hydrokinetic coupling means consisting of the impeller wheel 3, the turbine wheel 4 and the reactor 5.

In operation, the torque from the crankshaft 1 is transmitted to the cover 11 through the fastening means 13. In the disengaged position of the piston 28, the torque goes through the hydrokinetic coupling means, i.e. the impeller wheel 3 and then the turbine wheel 4 fixed to the hub 8. The torque is then transmitted to the transmission input shaft 2 coupled to the hub through the internal ribs of the hub 8.

In the engaged position of the piston 28, the torque from the cover 11 is transmitted to the linking member 23, then to the support 17 through the damping means formed by the supporting members 18 and by the elastic leaves 22. The torque is then transmitted to the internal hub 8 whereon the support 17 is fastened, then to the transmission input shaft 2 coupled to the hub 8 through the internal ribs of said hub 8.

In the engaged position of the piston 28, when the torque transmitted between the cover 11 and the hub 8 varies, the radial stresses exerted between each elastic blade 22 and the matching rolling body 18 vary and the bending of the elastic blade 22 is modified. The modification in the bending of the blade 22 comes with a motion of the rolling body 18 along the matching raceway 22e due to peripheral stresses.

The raceways 22e have profiles so arranged that, when the transmitted torque increases, the rolling bodies 18 each exert a bending stress on the matching elastic blade 22 which causes the free distal end of the elastic blade 22 to move towards the X axis and a relative rotation between the cover 11 and the hub 8 such that the later move away from their relative rest position. Rest position means the relative position of the cover 11 relative to the hub 8, wherein no torque is transmitted between the latter.

The profiles of the raceways 22e are thus such that the rolling bodies 18 exert bending stresses having radial components and circumferential components onto the elastic leaves 22.

The elastic leaves 22 exert, onto the rolling bodies 18, a backmoving force having a circumferential component which tends to rotate the rolling bodies 18 in a reverse direction of rotation and thus to move back the turbine wheel 4 and the hub 8 towards their relative rest position, and a radial component directed outwards which tends to maintain the raceway 22e supported by the matching rolling body 18.

Besides, the friction means 26, 27 generate hysteresis torques which makes it possible to control the amount of vibrations generated in operation, so as to enhance the damping of such vibrations and of the rotation acyclisms.

When the cover 11 and the hub 8 are in their rest position, the elastic leaves 22 are preferably radially pre-stressed toward the X axis so as to exert a reaction force directed radially outwards, so as to maintain the leaves 22 supported by the rolling bodies 18.

The profiles of the raceways 22e may equally be so arranged that the characteristic transmission curve of the torque according to the angular displacement is symmetrical or not relative to the rest position. According to an advantageous embodiment, the angular displacement may be more important in a so-called direct direction of rotation than in an opposite, so-called reverse direction of rotation.

The angular displacement of the cover 11 relative to the hub 8 may be greater than 20°, preferably greater than 40°.

The elastic leaves 22 are regularly distributed around the X axis and are symmetrical relative to the X axis so as to ensure the balance of the torque converter.

The invention claimed is:

1. A hydrokinetic torque coupling device for a motor vehicle, comprising
    a torque input element (11) intended to be coupled to a crankshaft (1),
    a turbine wheel (4),
    an impeller wheel (3) rotationally coupled to the torque input element (11) and able to hydrokinetically drive said turbine wheel (4),
    a torque output element (8) intended to be coupled to a transmission input shaft (2), clutch means (10) for rotationally coupling the torque input element (11) and the torque output element (8) in an engaged position, through damping means (18, 22) for damping vibrations, and able to rotationally uncouple the torque input element (11) and the torque output element (8) in a disengaged position, with the damping means (18, 22) being adapted to act against the rotation of the torque input element (11) relative to the torque output element (8), in the engaged position of the clutch means (10), with the damping means (18, 22) comprising at least an elastic blade (22) which rotates together with the torque output element (8) or the clutch means (10) respectively, and a supporting member (18) carried by the clutch means (10) or the torque output element (8) respectively, with the blade (22) being elastically maintained supported by said supporting member (18), with said elastic blade (22) being adapted to bend upon rotation of the torque input element (11) relative to the torque output element (8), in an engaged position, with the hydrokinetic torque coupling device further comprising friction means (26, 27) for generating a hysteresis torque through the relative motion of the supporting member (18) and the elastic blade (22).

2. A hydrokinetic torque coupling device according to claim 1, wherein the clutch means (10) comprises one piston (28) which can move between an engaged position wherein it is rotationally coupled to the torque input element (11) and a disengaged position wherein it is rotationally uncoupled from the torque input element (11), with the piston (28) being rotationally coupled to the supporting member (18).

3. A hydrokinetic torque coupling device according to claim 2, wherein the piston (28) is rotationally coupled to the supporting member (18) through a linking member (23), with the friction means (26, 27) for generating a hysteresis torque through the relative motion of the linking member (23) and the elastic blade (22).

4. A hydrokinetic torque coupling device according to claim 3, wherein the linking member (23) is fastened to the shaft (19) of the supporting member.

5. A hydrokinetic torque coupling device according to claim 3, wherein the elastic blade (22) comprises a fastening portion (22a) connected to the torque output element (8) and an elastic portion comprising a radially internal strand (22b), a radially external strand (22c), and a bowed or bent portion (22d) connecting the internal strand (22b) and the external strand (22c), with the external strand (22c) being supported by the supporting member (18), with the friction means (26, 27) for generating a hysteresis torque through the relative motion of the piston (28) or the linking member (23), and the external strand (22c) of the elastic blade (22).

6. A hydrokinetic torque coupling device according to claim 3, further comprising a flange (25) rotationally coupled to the torque output element (8), with the friction means (26, 27) for generating a hysteresis torque through the relative motion of the flange (25), and the supporting member (18) or the piston (28).

7. A hydrokinetic torque coupling device according to claim 3, wherein the supporting member comprises a rolling body (18) mounted to pivot about a shaft (19), with said shaft (19) being fastened to the clutch means (10).

8. A hydrokinetic torque coupling device according to claim 2, wherein the elastic blade (22) comprises a fastening portion (22a) connected to the torque output element (8) and an elastic portion comprising a radially internal strand (22b), a radially external strand (22c), and a bowed or bent portion (22d) connecting the internal strand (22b) and the external strand (22c), with the external strand (22c) being supported by the supporting member (18), with the friction means (26, 27) for generating a hysteresis torque through the relative motion of the piston (28) or the linking member (23) on the one hand, and the external strand (22c) of the elastic blade (22), on the other hand.

9. A hydrokinetic torque coupling device according to claim 8, further comprising a flange (25) rotationally coupled to the torque output element (8), with the friction means (26, 27) for generating a hysteresis torque through the relative motion of the flange (25), and the supporting member (18) or the piston (28).

10. A hydrokinetic torque coupling device according to claim 8, wherein the supporting member comprises a rolling body (18) mounted to pivot about a shaft (19), with said shaft (19) being fastened to the clutch means (10).

11. A hydrokinetic torque coupling device according to claim 2, further comprising a flange (25) rotationally coupled to the torque output element (8), with the friction means (26, 27) for generating a hysteresis torque through the relative motion of the flange (25), and the supporting member (18) or the piston (28).

12. A hydrokinetic torque coupling device according to claim 2, wherein the supporting member comprises a rolling body (18) mounted to pivot about a shaft (19), with said shaft (19) being fastened to the clutch means (10).

13. A hydrokinetic torque coupling device according to claim 1, wherein it comprises a flange (25) rotationally coupled to the torque output element (8), with the friction means (26, 27) for generating a hysteresis torque through the relative motion of the flange (25), and the supporting member (18) or the piston (28).

14. A hydrokinetic torque coupling device according to claim 13, wherein the friction means (26, 27) generates a hysteresis torque through the relative motion of the flange (25), and the shaft (19) of the supporting member.

15. A hydrokinetic torque coupling device according to claim 13, wherein the supporting member comprises a rolling body (18) mounted to pivot about a shaft (19), with said shaft (19) being fastened to the clutch means (10).

16. A hydrokinetic torque coupling device according to claim 1, wherein the supporting member comprises a rolling body (18) mounted to pivot about a shaft (19), with said shaft (19) being fastened to the clutch means (10).

17. A hydrokinetic torque coupling device according to claim 1, wherein the turbine wheel (4) is fastened to the torque output element (8).

18. A hydrokinetic torque coupling device according to claim 1, wherein the torque output element comprises a central hub (8).

19. A hydrokinetic torque coupling device according to claim 1, wherein the friction means (26, 27) comprise two friction surfaces, formed by the clutch lining, and supported by each other so as to rub each other through the relative motion of the two friction surfaces.

20. A hydrokinetic torque coupling device according to claim 1, wherein it comprises a reactor (5), with the impeller wheel (3) being able to hydrokinetically drive the turbine wheel (4) through the reactor (5).

* * * * *